US006640957B2

(12) United States Patent
Fargo et al.

(10) Patent No.: US 6,640,957 B2
(45) Date of Patent: Nov. 4, 2003

(54) RACETRACK STYLE PASSENGER CONVEYOR

(75) Inventors: Richard Fargo, Plainville, CT (US); Frank Sansevero, Glastonbury, CT (US); Rob Hammell, Killingworth, CT (US); David Jarvis, West Hartford, CT (US)

(73) Assignee: Otis Elevator Company, Farmington, CT (US)

(*) Notice: Subject to any disclaimer, the term of this patent is extended or adjusted under 35 U.S.C. 154(b) by 0 days.

(21) Appl. No.: 10/036,651

(22) Filed: Dec. 21, 2001

(65) Prior Publication Data

US 2003/0116403 A1 Jun. 26, 2003

(51) Int. Cl.[7] .................. B65G 15/00

(52) U.S. Cl. .................. 198/321; 198/330; 198/326; 198/851

(58) Field of Search .................. 198/321, 330, 198/326, 851

(56) References Cited

U.S. PATENT DOCUMENTS

| | | | | | |
|---|---|---|---|---|---|
| 1,956,714 | A | * | 5/1934 | Graff-Baker | 198/203 |
| 2,005,067 | A | * | 6/1935 | Graff-Baker | 198/16 |
| 2,282,050 | A | * | 5/1942 | Handy et al. | 198/16 |
| 2,491,974 | A | * | 12/1949 | Hansen | 74/243 |
| 2,816,642 | A | * | 12/1957 | Sundberg | 198/16 |
| 2,949,178 | A | * | 8/1960 | Fabula | 198/16 |
| 3,185,108 | A | * | 5/1965 | Muller | 104/25 |
| 3,297,127 | A | * | 1/1967 | Dennerlein | 198/16 |
| 3,314,517 | A | * | 4/1967 | Karr | 198/16 |
| 3,379,300 | A | * | 4/1968 | Karr | 198/181 |
| 3,395,648 | A | * | 8/1968 | Karr et al. | 104/25 |
| 3,399,758 | A | * | 9/1968 | Karr | 198/181 |
| 3,493,097 | A | * | 2/1970 | Karr | 198/181 |
| 3,498,445 | A | * | 3/1970 | Piper | 198/181 |
| 3,513,780 | A | * | 5/1970 | Jenkins | 104/25 |
| 3,530,799 | A | * | 9/1970 | Braun | 104/25 |
| 3,658,166 | A | * | 4/1972 | Hara et al. | 198/16 |
| 3,750,863 | A | * | 8/1973 | Dyczynski | 198/189 |
| 3,828,687 | A | * | 8/1974 | McKeen | 104/154 |
| 3,844,219 | A | * | 10/1974 | Jenkins | 104/25 |
| 3,964,596 | A | * | 6/1976 | Heusler et al. | 198/16 MS |
| 4,299,321 | A | * | 11/1981 | Hermawan | 198/321 |
| 4,470,497 | A | | 9/1984 | Kraft | |
| 4,565,276 | A | * | 1/1986 | Dengs et al. | 198/321 |
| 5,042,648 | A | * | 8/1991 | Garvey | 198/853 |
| 5,052,539 | A | * | 10/1991 | Fillingsness et al. | 198/328 |
| 5,176,239 | A | * | 1/1993 | Findlay et al. | 198/321 |
| 6,170,632 | B1 | * | 1/2001 | Shimura et al. | 198/334 |
| 6,450,316 | B1 | * | 9/2002 | Stuffel et al. | 198/326 |

OTHER PUBLICATIONS

Oct., 1976 publication entitled "Center of the Escalator World".

* cited by examiner

*Primary Examiner*—Christopher P. Ellis
*Assistant Examiner*—Rashmi Sharma
(74) *Attorney, Agent, or Firm*—Carlson, Gaskey & Olds

(57) ABSTRACT

A passenger conveyor system is arranged along a path in a racetrack fashion. Drive members associated with lateral edges of each pallet step surface move with the pallets through straight sections of the path to avoid relative movement between the pallets and adjacent structure. During turnaround sections, where the pallets are beneath a floor surface, the drive members move relative to each other, with one set of drive members becoming temporarily disconnected from each other, to permit the pallets to make a transition and a turnaround. In the illustrated example, a drive mechanism cooperates with at least one set of the drive members to transmit a motive force to propel the pallets along the path.

19 Claims, 8 Drawing Sheets

RACETRACK STYLE PASSENGER CONVEYOR

BACKGROUND OF THE INVENTION

This invention generally relates to passenger conveyor systems. More particularly, this invention relates to passenger conveyor systems having parallel straight-aways moving in opposite directions with moving drive members.

Conventional passenger conveyors, such as moving walkways or escalators, typically include a chain of steps that travel in a loop to provide a continuous movement along a specified path. Typical arrangements include an arrangement where the steps pass along the exposed moving pathway and then move beneath the exposed pathway as they travel a return path of the loop hidden beneath the exposed moving steps. With such arrangements, separate loops of steps are required to provide motion in different directions. Additionally, each loop requires its own drive assembly to provide the necessary movement.

Designers of passenger conveyor systems face several challenges including space constraints, system expense and safety concerns. Passenger conveyor systems need to fit within packaging constraints dictated by building structures or layouts.

A significant amount of space typically is required for the drive assemblies associated with the individual chains of steps along each loop of the passenger conveyor pathways. Those skilled in the art have long been striving to develop conveyor arrangements that do not require as much space as conventional systems. Minimizing the space required for a conveyor system typically must be balanced with the need to provide adequate system performance (i.e., load carrying capacity) and minimizing system expenses.

System expenses typically are caused by the number of parts and the complexity of the components. Minimizing duplication of parts is always a goal to make passenger conveyor systems more economical.

Another issue presented by escalator style passenger conveyor systems is the possibility for objects to become caught between the moving steps and the stationary system structure. This possibility is greatest at transition zones such as near landings.

Various attempts have been made at minimizing or eliminating the possibility for objects to become caught at the interface between moving parts in a passenger conveyor system. Stationary skirt panels do not eliminate relative motion although they do cover some of the conveyor components. Moveable skirt panels have been proposed, but not always successfully implemented in the marketplace. An example proposal is shown in U.S. Pat. No. 4,470,497, which has a two-piece skirt guard arrangement that has not proven successful in the marketplace.

There is a need for an arrangement that minimizes space requirement, reduces expenses and guards against the possibility for objects to become caught or entrapped at the interface of moving parts in a passenger conveyor system. This invention addresses that need in a manner that is superior to previously attempted arrangements. Moreover, this invention makes it possible to utilize a racetrack style loop of steps that eliminates duplication of parts and presents substantial cost and space savings.

SUMMARY OF THE INVENTION

In general terms, this invention is a racetrack style passenger conveyor system. A system designed according to this invention includes a plurality of pallets each having a step surface that is adapted to support at least one foot of at least one passenger. The pallets travel along a continuous path that includes two straight sections moving in different directions and a turn around section at each end of the straight sections.

A plurality of first drive members are associated with the first lateral edges of the pallets. The first drive members are connected together to be moveable relative to each other, which facilitates the pallets traveling around the turnaround sections of the continuous path.

A plurality of second drive members are associated with the second lateral edges of the pallets. The second drive members include a releasable connection between adjacent second drive members that is operative to maintain adjacent second drive members together as the corresponding pallets travel along the straight sections and to release the adjacent drive members from each other when the corresponding pallets travel along the turnaround sections.

Another aspect of a conveyor system designed according to this invention includes a drive mechanism that engages at least the first plurality of drive members so that a motive force provided by the drive mechanism propels the pallets along the path. In one example, the drive mechanism also engages the plurality of second drive members.

Another aspect of this invention is providing a first plurality of drive members along an inner side of the path followed by the steps. The first plurality of drive members preferably remain connected together throughout the travel along the entire path. Another plurality of drive members are associated with an outer side of the loop. The outer side drive members preferably remain connected together along straight sections of the path. The outer side drive members preferably disconnect from each other to allow spacing between outer edges of adjacent pallets so that the pallets can travel along the turnaround sections of the path.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENT

Figure 1:
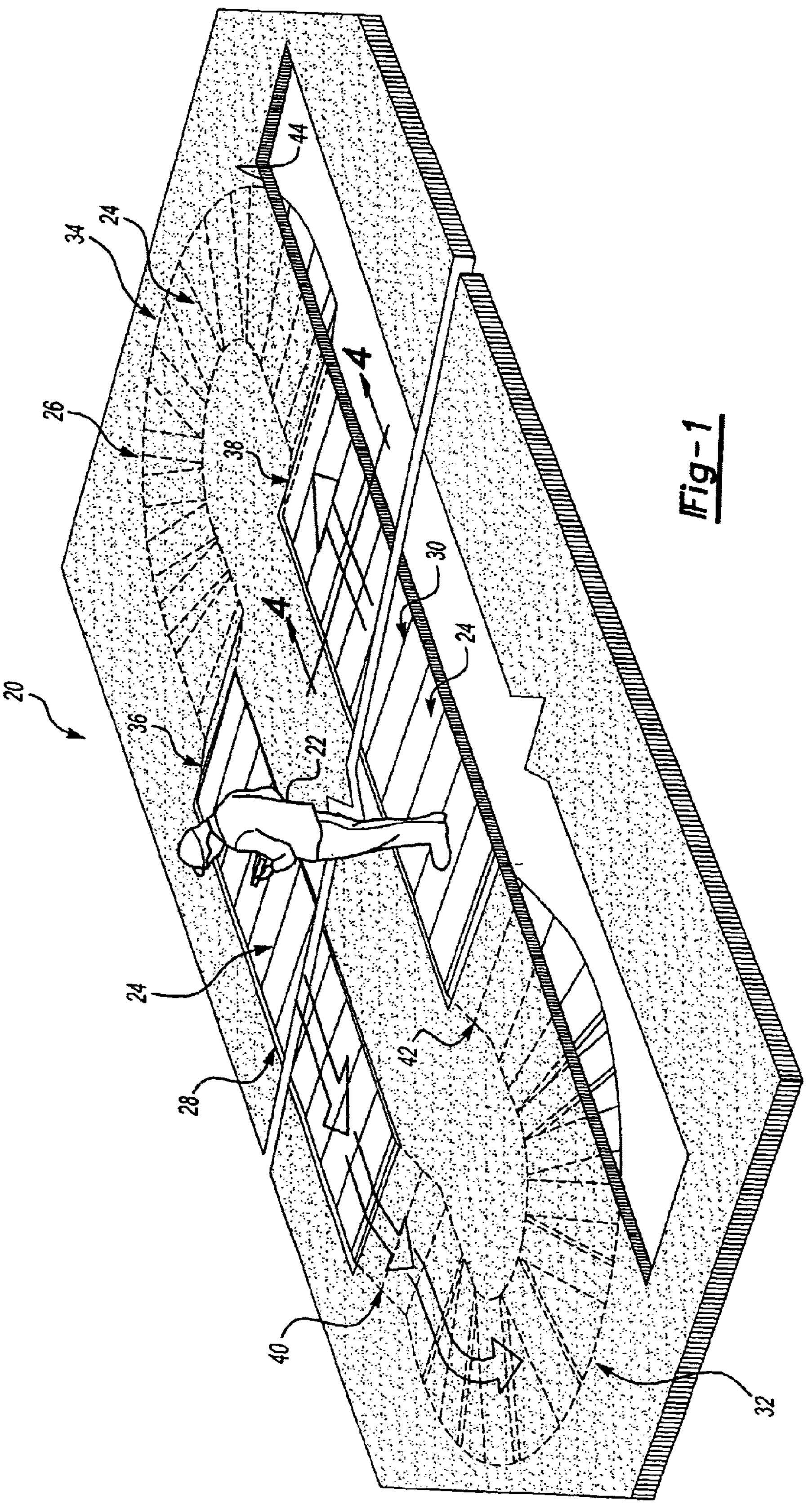
FIG. 1 schematically illustrates a passenger conveyor system designed according to an example embodiment of this invention.

A passenger conveyor system 20 carries a passenger 22 on one or more pallets 24. The illustrated system shown in the example of FIG. 1 is a moving walkway style conveyor. While a moving walkway is used as the example embodiment, this invention is not limited to such an arrangement. Escalators that carry passengers between levels or floors within a building, for example, are also within the scope of this invention.

The pallets 24 of the conveyor system 20 travel along a continuous path 26 that has a "racetrack style" layout. The path 26 includes two straight sections 28 and 30. The straight sections 28 and 30 are parallel to each other but the pallets 24 move in opposite directions on the respective straight sections. Turn around sections 32 and 34 connect adjacent ends of the straight sections. Transitional zones 36, 38, 40 and 42 facilitate moving the pallets 24 below a floor surface 44 before the pallets move through the turnaround sections 32 or 34.

Figure 2:
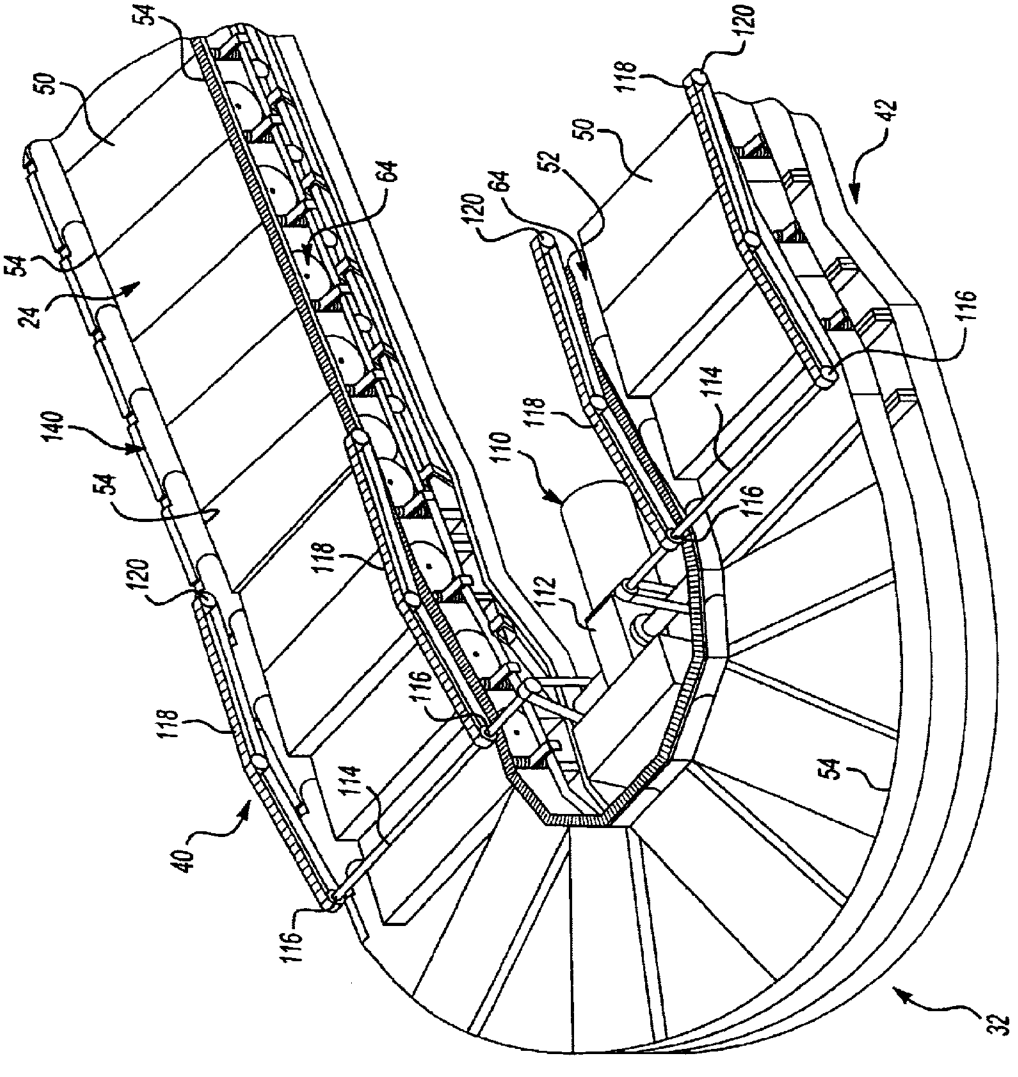
FIG. 2 schematically illustrates, in somewhat more detail, selected portions of the passenger conveyor of FIG. 1.
Figure 3:
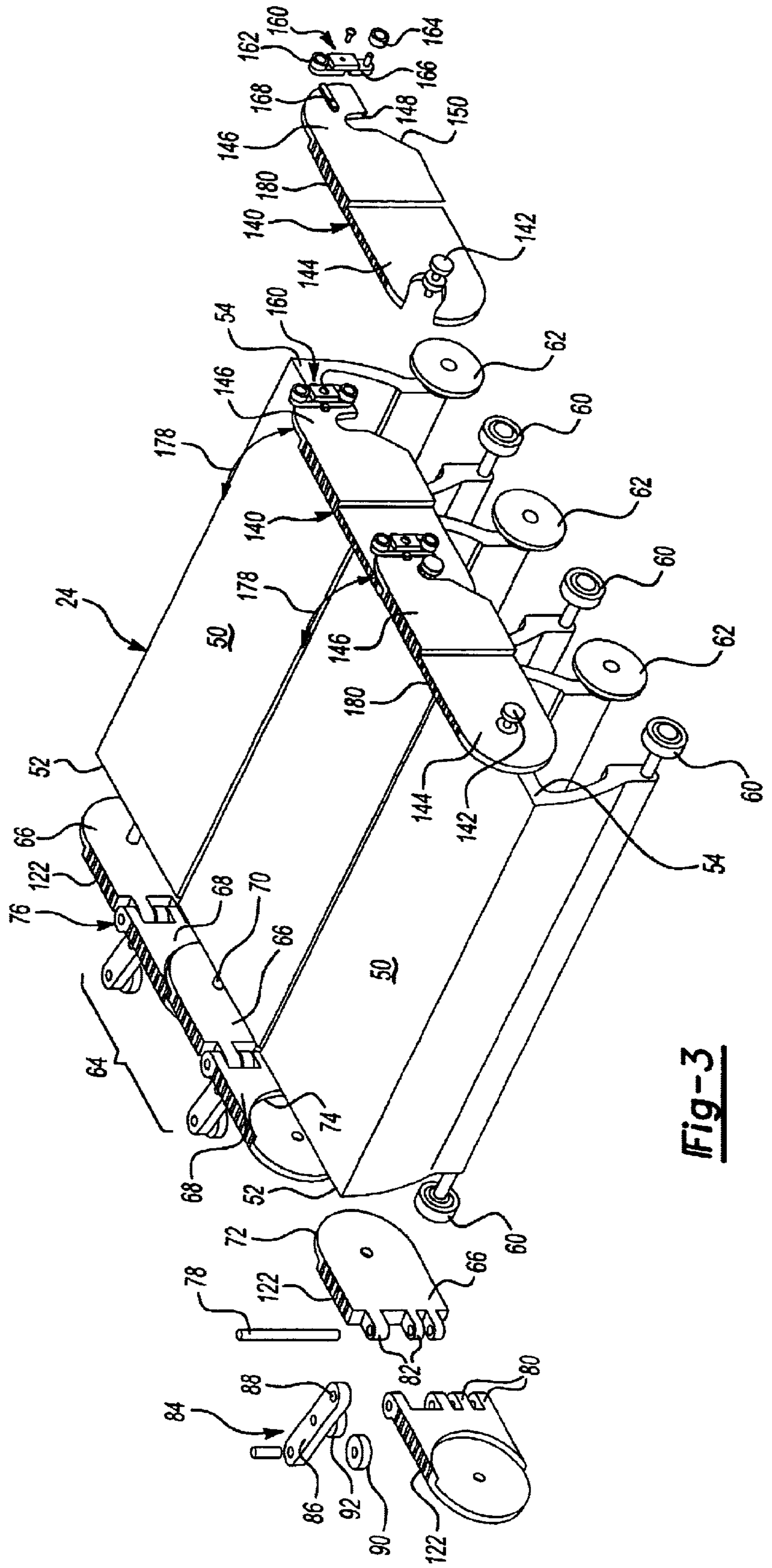
FIG. 3 is a perspective, partially exploded view of selected pallet and drive member components of the example embodiment.

As can be best appreciated from FIGS. 2 and 3, the pallets 24 each include a step surface 50 that is adapted to support at least one foot of at least one passenger. A first lateral edge 52 of the step surface 50 faces toward an inside of the path 26. A second lateral edge 54 faces toward an outside of the path.

A plurality of rollers 60 and 62 preferably support the pallets 24 so that the pallets are moveable along the path 26. The rollers 62 in the illustrated example have a larger diameter to accommodate the different distances traveled by the first lateral edges 52 and second lateral edges 54 of the pallets 24 through the turnaround sections 32 and 34.

A first plurality of drive members 64 preferably are associated with the first lateral edges 52 of each of the pallets 24. In the illustrated example, the drive members also serve as step flanges adjacent the step surfaces. A variety of drive member configurations are within the scope of this invention. The illustrated example includes the efficiency of integrating a step flange function and the drive component function into fewer parts than might otherwise be required.

The drive members 64 preferably remain connected together along the entire path 26. The illustrated flange-style drive members 64 preferably remain stationary relative to the corresponding step surfaces 50 as the pallets 24 move along the straight sections 28 and 30 of the path 26. Keeping the flange-style drive members 62 stationary relative to the corresponding step surfaces 50 along the straight sections eliminates relative movement between the step surfaces and adjacent structure at least as high as the drive members 64 extend above the step surfaces 50. Eliminating relative movement between the step surfaces and the adjacent structure of the pallet members 64 eliminates the possibility for objects to be caught at the interface along the lateral edges 52 of the steps.

In the illustrated example, each drive member 64 includes two drive panel portions 66 and 68. The drive panel portions 66 and 68 preferably are supported on a support member 70, which is fixed relative to the corresponding pallet, so that the panel portions 66 and 68 move with the pallets 24 along the path 26. The panel portions 66 and 68 preferably are moveable relative to each other and able to pivot about the support member 70 as the pallets 24 move through the transition zones, where the level or height of the pallets change. The relative pivotable motion accommodates such relative movement between the pallets while keeping the drive members 64 connected. The illustrated example includes an overlapping, nesting arrangement between a medial portion 72 on the panel portion 66 and a medial receiving portion 74 on the panel portion 68. The rounded, cooperating arrangement between the overlapping sections of the panel portions 66 and 68 preferably provides a co-planar arrangement along the first lateral edge 52 of the pallets 24 while still accommodating some relative motion between the panel portions 66 and 68 at certain portions of the movement of the pallets 24 along the path 26. Such relative movement preferably occurs behind or beneath other structure so that the panel portions are not exposed and there is no chance for unwanted entanglement of an object between moving components.

Adjacent drive members 64 preferably are pivotally connected to each other at 76. In the illustrated example, a panel portion 68 of one drive member 64 is pivotally coupled with a panel portion 66 of another drive member 64. A post 78 preferably provides a pivoting axis about which the panel portions 66 and 68 of adjacent drive members 64 can pivot. The illustrated example includes a plurality of support arms 80 on the panel portions 68 that are interdigitated with a plurality of support arms 82 on the panel portion 66. The post 78 preferably is received through openings in the support arms so that the panel portions 66 and 68 are pivotable relative to each other about the axis of the post 78.

A follower device 84 preferably is associated with each end of each drive member 64. In the illustrated example, the follower devices 84 include a support arm 86 having an opening 88 through which the post 78 is received so that the support arm 86 is pivotable about the axis of the post 78. The support arm 86 supports rollers 90 and 92, that ride along opposite sides of a guide rail 94 (as best seen in FIG. 4), which is part of a conveyor guide structure 100.

Figure 6:
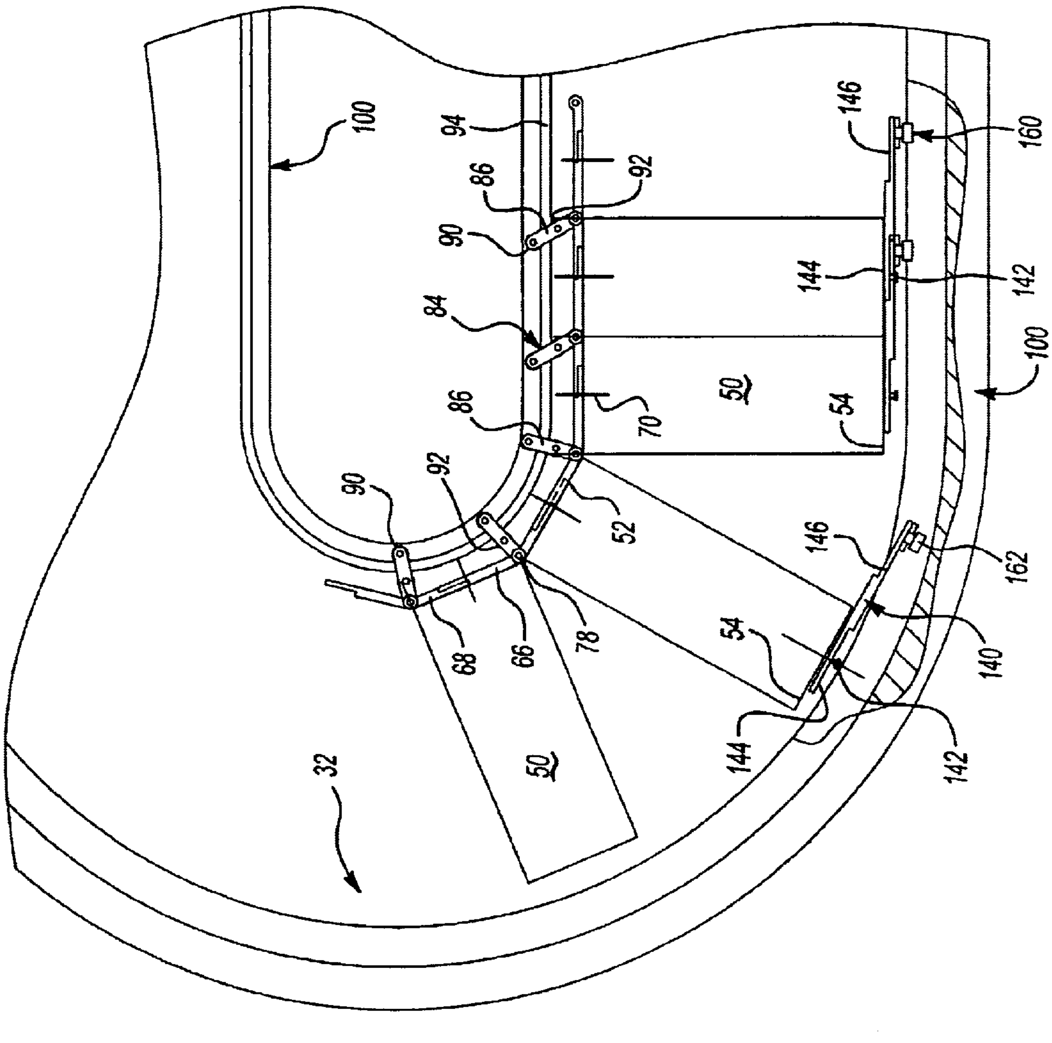
FIG. 6 is a plan view schematically illustrating selected portions of the example passenger conveyor at a transition and turnaround portion of a path followed by the conveyor pallets.

As the pallets 50 move through the transitional zones and into the turnaround sections, the follower devices 84 guide the first lateral edge of the pallets 52 around the guide rail 94. Having a follower device aligned with the leading and following edges of each step surface 50 with rollers 90 and 92 on opposite sides of the rail 94 provides a turning force at two points for each pallet, which provides the moment necessary to give the pallets 50 an angular acceleration in the turnaround section. The pivotal connections at 76 allow the pallets 24 to travel through the turnaround sections (as best appreciated from the illustration of FIG. 6). The support arms 86 preferably are pivotal relative to the associated drive member panel portions to allow smoother movement through the turnaround sections.

Figure 4:
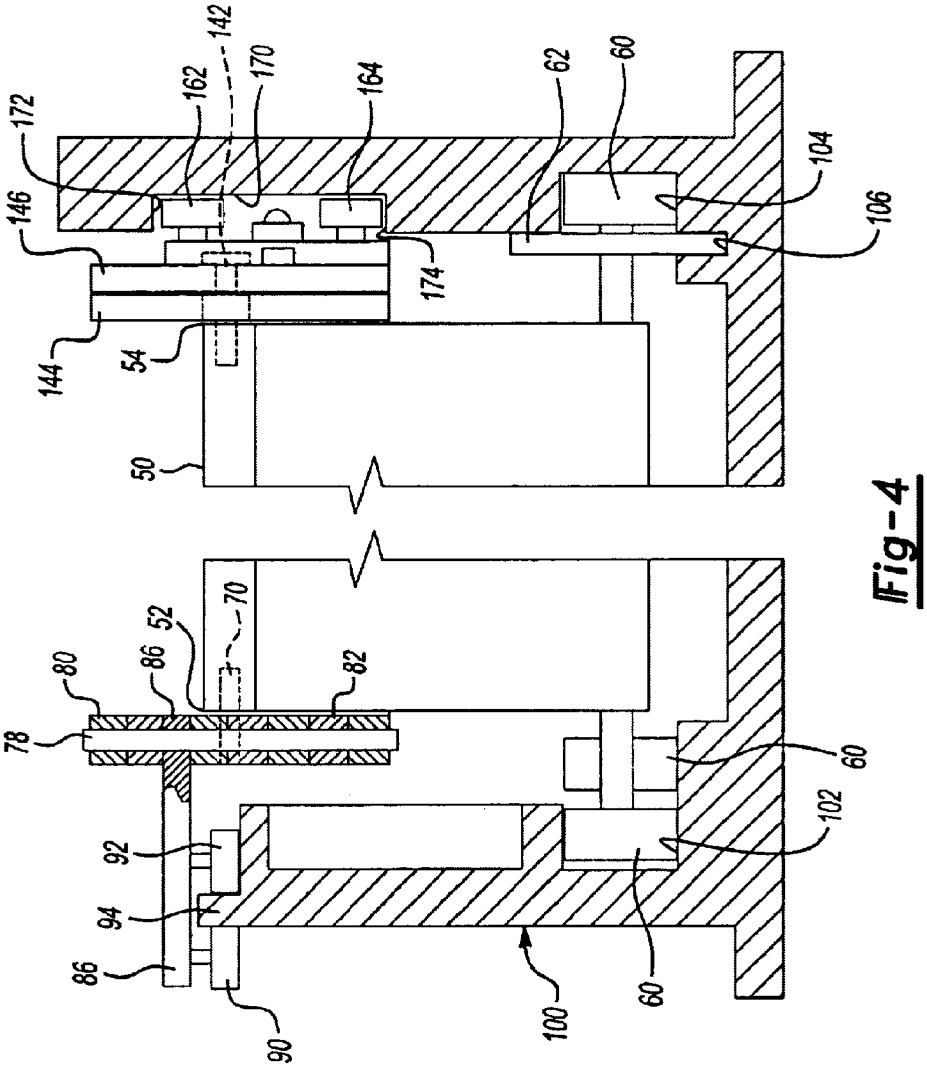
FIG. 4 is a partial cross-sectional illustration taken along the lines 4—4 of FIG. 1.
Figure 5:
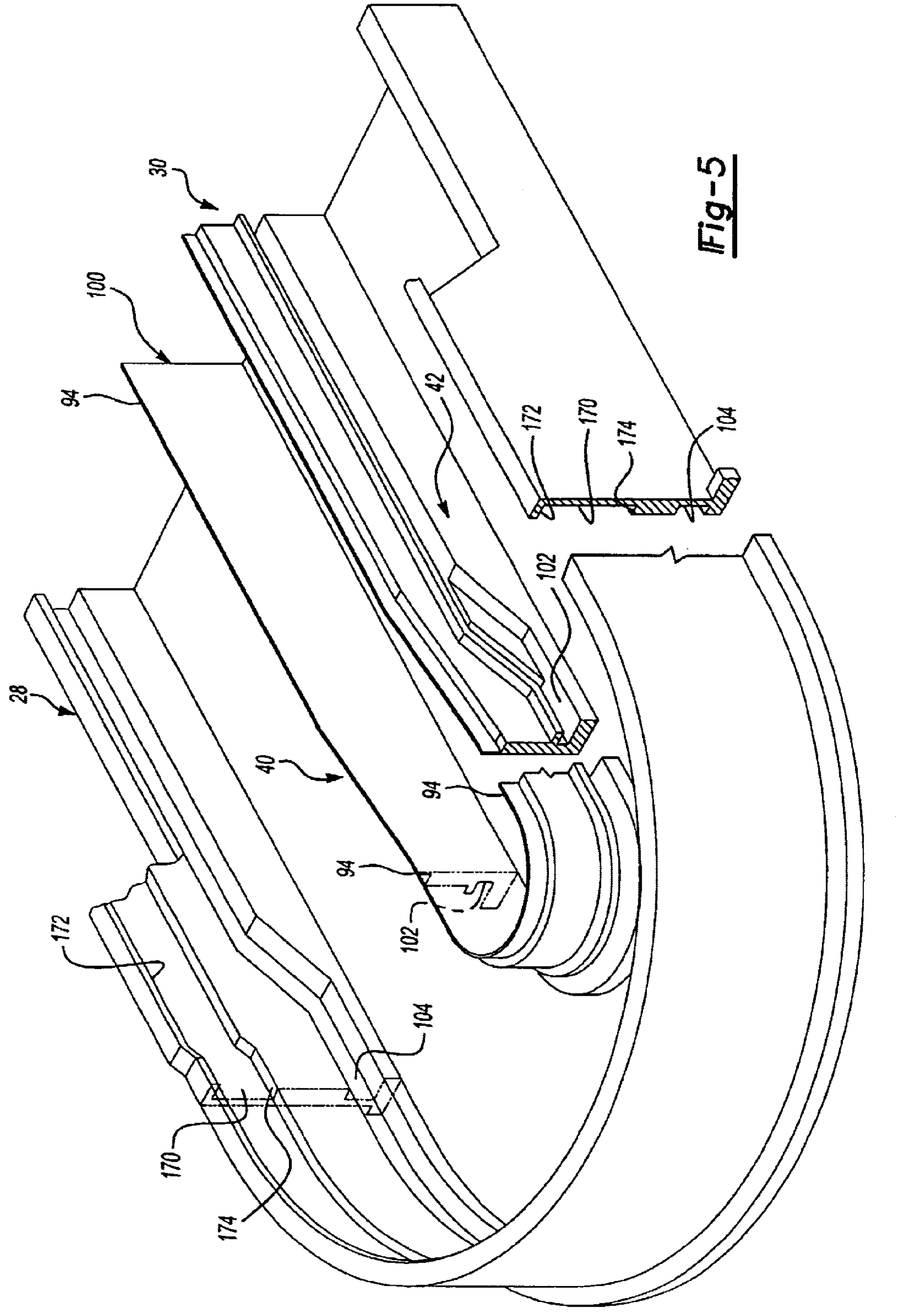
FIG. 5 is a schematic, perspective illustration of a portion of a guide structure that is useful with the example embodiment.

As can be appreciated from FIGS. 4 and 5, the guide structure 100 includes a roller track 102 for guiding the rollers 60 on the inside of the pallets 24 ("inside" referring to the inner side of the path 26). A similar guide path 104 is on an outer side of the structure 100 for guiding the outwardly positioned rollers 60. The larger size rollers 62 preferably are guided within another guide channel 106. The guide channels 102, 104 and 106 preferably limit movement of the rollers 60 and 62 so that the pallets 24 move smoothly and continuously without excess or undesirable vibration or deviation from the desired path.

Figure 7:
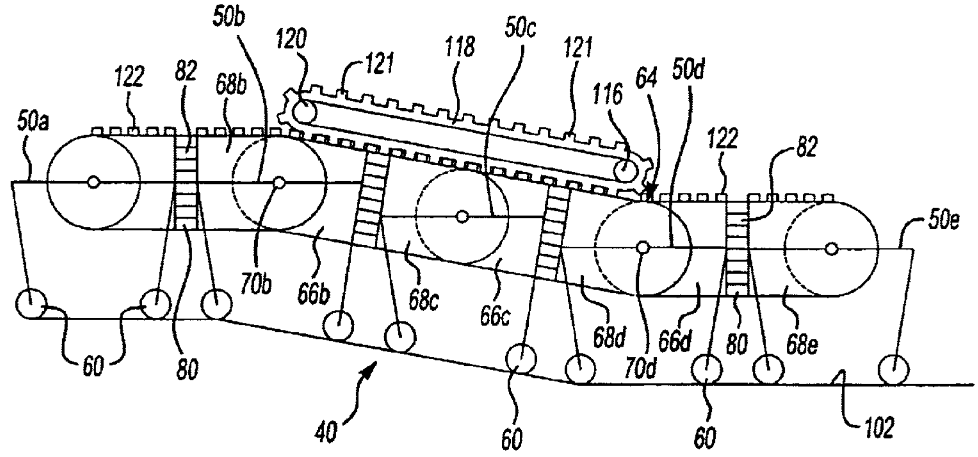
FIG. 7 schematically illustrates the operation of selected portions of an inner side plurality of drive members as the conveyor travels along a transition section of the path followed by the conveyor.

As best seen in FIGS. 2 and 7, a drive assembly 110 provides a motive force to move the pallets. 24 along the path 26. The illustrated example includes a single motor and brake assembly 112 that provides the motive force for moving the entire set of pallets 24. A significant advantage of this invention is that it minimizes the number of drive components needed to provide movement along two straight sections 28 and 30 of the path 26. Of course, there may be situations where the size of the conveyor system 20 is so large that multiple drive units are desired or needed to accommodate the expected passenger volume. A passenger conveyor system designed according to this invention, however, does not require independent drive mechanisms for each of the moving straight-away sections, which was required in the prior art.

Drive arms 114 extend from the motor and brake unit 112 and preferably rotate to rotate drive sheaves 116. The drive sheaves 116 cause movement of drive belts 118, which have passive sheaves 120 within loops defined by the drive belts 118. The drive belts 118 preferably are made from a rubber material.

The drive belts 118 preferably are cogged to include a number of projections or teeth 121 that cooperate with correspondingly shaped projections or teeth 122 on the drive members 64 (best seen in FIGS. 7 and 3). The direct engagement of the drive belts 118 and the drive members 64 provides a unique drive arrangement where no separate drive chain is required. Because the drive members 64 are connected together and to their corresponding pallets 24, the drive members effectively form a chain for propelling the pallets 24 along the pathway responsive to the motive force provided by the drive assembly 110.

The drive assembly 110 preferably is hidden beneath the floor surface 44. The drive belts 118 preferably are positioned to engage the drive members 64 as the pallets 24 travel through the transition zones 40 and 42, respectively. A drive arrangement designed according to this invention provides substantial space, component, material and cost savings compared to other passenger conveyor systems.

Figure 2A:
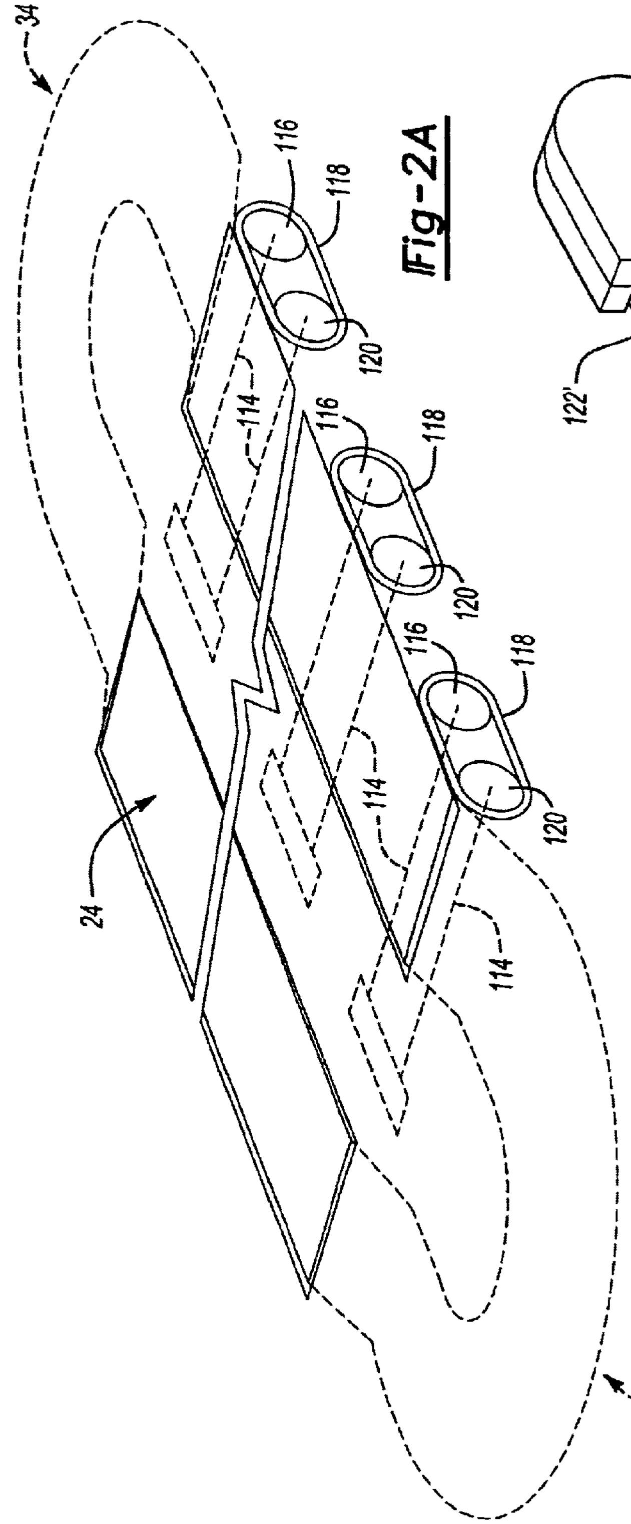
FIG. 2A schematically illustrates an example embodiment of this invention that includes multiple drive mechanisms.

In FIG. 2, one drive mechanism 110 is illustrated. In some circumstances, especially with longer walkways or escalators, multiple drive mechanisms 110 may be required. Such an arrangement is schematically shown in FIG. 2A. In the example of FIG. 2A, a drive mechanism 110 is associated with each end of the walkway near the turn around sections. An intermediate drive mechanism 110 is placed at a strategic location along the straightaway portion of the walkway. Given this description, those skilled in the art will be able to select the appropriate number of drive mechanisms to accommodate the needs of a particular situation.

Figure 2B:
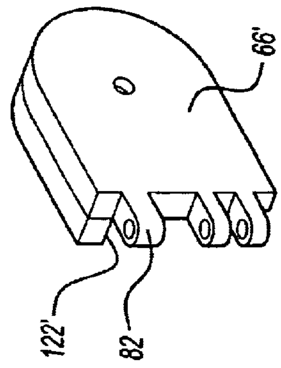
FIG. 2B is a perspective illustration of a selected component of an alternative to the arrangement of a drive member shown in FIG. 3.
Figure 2C:
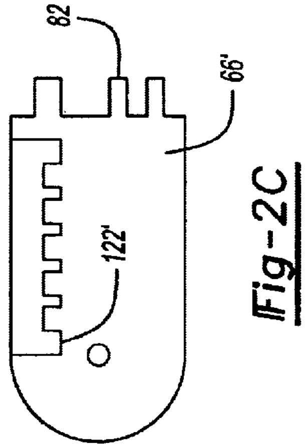
FIG. 2C is a side view of the example of FIG. 2B.

In the example previously discussed, the drive belt 118 engages a top surface on the drive members 64, for example. In another example, the drive belt is positioned such that the drive arms 114 extend beneath the walkway as schematically illustrated in FIG. 2A. In such an arrangement, the drive member 64 preferably include projections or teeth 122' as shown in FIGS. 2B and 2C. The drive panel portion 66 include an extension upon which the teeth 122' are supported in a downward facing direction for proper engagement with the drive belt 118. 'Referring to FIG. 7, the transition zone 40 is schematically illustrated. As the pallets 24 move into the transitional zone, the guide track 102 is angled relative to the floor surface so that the pallets move between a floor height and a lower height where the pallets are hidden beneath a floor surface during the turnaround. Depending on the motion of the pallets, the transitional zone may be where the pallets are leaving the floor level to drop down to the turn around level or leaving the turn around level to move back up to the floor level. In either instance, the panel portions 66 and 68 of the drive member 64 move relative to each other as the steps move through the transitional zone.

For example, the pallet 50A is at the height of the pallets moving through the straight-away sections. The pallet 50B is entering the transitional zone 40 and beginning to drop to a lower height. The pallet 50C is further down the ramp of the track 102 in the transitional zone 40. Because of the height difference between the pallets 50B and 50C, there is relative pivotal movement between the panel portions 66B and 68B about the pivot 70B. The nature of the coupling 76 between the panel portions 66B and 68C keeps those two panel portions aligned with each other at that particular location along the path 26.

The height difference between the pallets 50C and 50D causes relative pivotal movement between the panel portions 68C and 66C. The cooperating nesting sections 72 and 74 (see FIG. 3) of the panel portions allows the relative pivotal movement about the support 70C.

Similarly, the difference in height between the pallets 50E and 50D causes relative pivotal movement between the panel portions 68D and 66D. The panel portions 66D and 68E remain aligned with each other during such relative moment between the panels 68D and 66D.

The relative pivotal movement provided preferably at the central axis of each pallet 50 allows a smooth transition through the transition zones where the pallets change height. The illustrated arrangement also provides the significant advantage of having stationary drive members adjacent the lateral edge 52 of the step surface 50 while the pallets are moving through the straight sections where a passenger may be on the conveyor. The plurality of first drive members 64, therefore, provides an arrangement where there is no relative movement between the step surfaces of the pallets and the structure immediately adjacent the lateral edge 52 of the step along the straight sections 28 and 30 yet still accommodates movement through the transitional zones 36, 38, 40 and 42 so that the pallets may move beneath the floor surface 44 and through the turnaround sections.

A second plurality of drive members 140 preferably are associated with the second lateral edges 54 of the pallets 24. These drive members are also step flanges in the example embodiment. Other configurations are possible. In the illustrated example, the second plurality of drive members 140 are pivotably supported relative to the pallets 24 by support posts 142, which remain fixed relative to the corresponding pallet.

The illustrated second plurality of drive members 140 each have a first portion 144 that is adjacent to and aligned with one of the step surfaces 50 and a second portion 146 that extends beyond the step surface. The second portion 146 of one drive member 140 preferably overlaps with a first portion 144 of an adjacent drive member 140. The second portion 146 preferably includes a hook 148 that selectively engages the support post 142 on the corresponding adjacent pallet 24. A ramped or chamfered surface 150 preferably is provided to facilitate the hook 148 engaging the support post 142 of an adjacent pallet 24.

When the hook portion 148 of one drive member 140 engages the support post 142 of an adjacent pallet 24, the drive members are linked together and the outside edges of the pallets are held together to move in unison. The hooks 148 and support posts 142 preferably are engaged as the pallets 24 move through the straight sections 28 and 30 and a portion of the transitional zones. The drive members 140, therefore, eliminate relative motion at the lateral edges 54 of the pallets along the straight sections. The hooks 148 preferably are disengaged from the corresponding support posts 142 in the transitional zones to allow the pallets 24 to move through the turnaround sections as can be appreciated in FIGS. 2 and 6, for example.

Each of the drive members 140 preferably carries a follower device 160. Each follower device includes a set of rollers 162 and 164 supported on a support arm 166. The support arm preferably is mounted to a boss 168 on an outwardly facing surface on the second portion 146 of the drive member 140.

Figure 8:
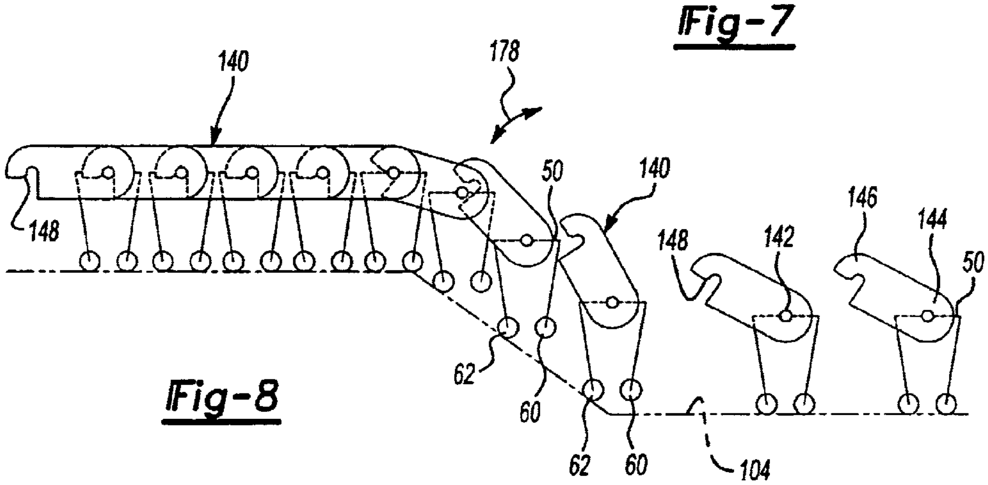
FIG. 8 schematically illustrates the operation of selected portions of a plurality of outer drive members as the conveyor travels along a transition section of the path followed by the conveyor.

FIG. 8 schematically illustrates the movement of the drive members 140 as the pallets 24 move through a transitional zone and around the turnaround sections.

The follower devices 160 preferably are guided through a track 170 on the guide structure 100. The track 170 in the illustrated example includes an upper surface 172 that is followed by the roller 162 and a lower surface 174 that is followed by the roller 164. The dimensions of the track 170 preferably allow some relative upward and downward movement of the follower devices 160. In other words, the rollers 162 and 164 preferably do not always engage both surfaces 172 and 174.

The track 170 preferably is positioned vertically relative to the track 104 such that the hook portions 148 become disengaged from a corresponding support post 142 as the pallets move from a straight section into a transitional zone toward a turnaround. Likewise, the track 170 preferably is vertically positioned; relative to the track 104 so that the hook portions 148 reengage the support post 142 of an adjacent pallet as the pallets move out of a turnaround section through a transitional zone back to a straight section.

Figure 9:
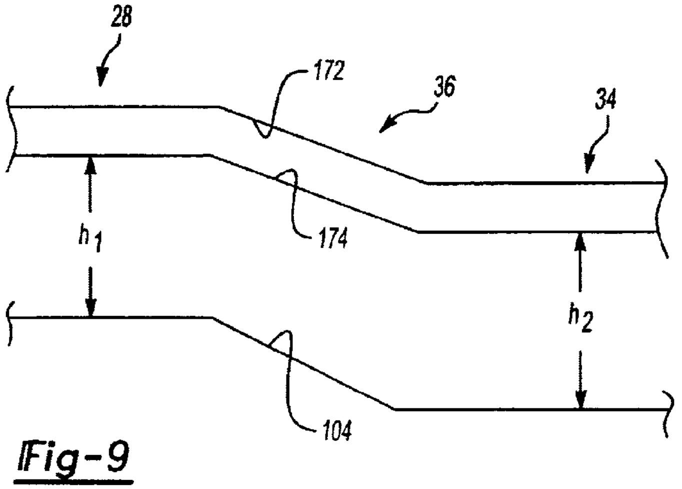
FIG. 9 schematically illustrates a relationship between various portions of the guide structure schematically illustrated in FIG. 5.

The positional relationships of the tracks 170 and 104 are schematically illustrated in FIG. 9. In a straight section 28, a first height hi separates the track 104 from the track 170. In the transitional zone 36, the spacing between the tracks 170 and 104 preferably changes from the height hi to a separation height $h_2$ within the turnaround section 34. Through the transitional zone 36 the changing height or spacing between the tracks 170 and 104 causes the follower devices 160 to effectively raise the hook portions 148 off of and separated from the corresponding support post 142 or to reengage the hook portions 148 and support posts 142 (depending on the direction of travel through a transitional zone). In one example, the pallets move down (or up) by one pallet length through the transitional zones. This motion is schematically illustrated by the arrow 178 (see FIGS. 3 and 8).

Referring to FIGS. 3, 8 and 9, as the pallets 24 move from the straight section 28 through the transitional zone 36 toward the turnaround section 34, the follower devices 160 follow the track 170 while the rollers 60 and 62 follow the tracks 104 and 106, respectively. As the pallets 24 begin to move down through the transitional zone 40, the follower devices 160 are maintained at a relatively higher height so that the second portion 146 of one drive member 140 is effectively raised relative to the adjacent pallet 24. During this motion (schematically illustrated by the arrow 178) the hook portion 148 becomes disengaged from the corresponding support post 142. The drive members 140 preferably pivot about the support posts 142 relative to their corresponding pallet. This disengagement preferably is progressive as the pallets move through the transitional zone. Upon entering the turnaround section, the drive members 140 are disconnected from each other so that the outer portion or second lateral edge 54 of each pallet is free to follow through the turnaround section without being connected to an adjacent pallet. Having the drive members 64 connected and the drive members 140 disconnected allows the pallets to make the necessary transition through the turnaround sections.

After traveling through a turnaround section, the hooks 148 on the drive members 140 reengage with the support post of an adjacent pallet and drive member because the follower devices 160 are guided by the track to cause the necessary motion. The transitional motion of the drive members 140 through the transitional zones provides disconnection or reconnection of adjacent drive members depending on whether the transitional zone moves from a floor surface down to the turnaround level or from the turnaround level back up to the floor surface.

The angle or slope of the ramp 174 through the transitional zone 36 preferably is less steep than that on the track 104 through the transitional zone 36. This allows the pallets 24 to change height faster than the follower devices 160, which facilitates hooking or unhooking the hook portions 148 from the support posts 142 of an adjacent pallet. The angled or chamfered surfaces 150 facilitate placing the hooks 148 on the corresponding support posts 142 as the pallets 24 move from a turnaround section back to the straight sections where the drive members 140 are connected.

The drive members 140 remain stationary relative to the pallets and the step surfaces 50 throughout the straight sections. The drive members 140 move relative to their corresponding pallets through the transitional zones and are disconnected from each other through the turnaround sections.

The second plurality of drive members 140 preferably include drive members 180 that are engaged by corresponding drive members 121 on the drive belts 118.

With such an arrangement, a motive force for propelling the pallets 24 around the path 26 is provided on both lateral sides of the series of pallets, which provides more uniform motion and ensures smoother operation.

A passenger conveyor designed according to this invention represents a substantial improvement compared to conventional systems. With this invention, the return line, which is typically concealed within the conveyor structure and does not carry any passengers, is effectively eliminated. Instead, the pallets 24 are always used in a passenger-carrying capacity except during the transition and turnaround sections. It is believed that this invention provides at least a 40 percent savings in the cost of the pallets, rollers, associated linkages, tracks and brackets compared to traditional systems. A significant savings is provided by reducing the number of parts and components required, especially reducing the multiple drive mechanisms and controllers.

Eliminating the concealed return line allows for smaller truss depth, which makes the conveyor system more compact and more readily incorporated into a variety of building structures. Another advantage of the inventive arrangement is placing the drive mechanism between the two moving straight sections, allowing isolation of the drive mechanism components from the trusses of the straight sections, which reduces noise transmission through the truss structures.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A passenger conveyor system, comprising:

a plurality of pallets each having a step surface that is adapted to support at least one foot of at least one passenger with a first lateral edge on one side of the step surface and a second lateral edge on an opposite side of the step surface, the pallets traveling along a continuous path that includes two parallel, passenger supporting, straight sections moving in different directions and a turnaround section at each end of the straight sections;

a plurality of first drive members associated with the first lateral edges of the pallets, the first drive members being connected together and movable relative to each other as the pallets travel along the turnaround sections; and a plurality of second drive members associated with the second lateral edges of the pallets, the second drive members including a releasable connection between adjacent second drive members that is operative to maintain adjacent second drive members together as the corresponding pallets travel along the straight sections and to release adjacent second drive members from each other when the corresponding pallets travel along the turnaround sections.

2. The system of claim 1, wherein the step surfaces of the pallets all face in a generally upward direction throughout the entire travel along the path.

3. The system of claim 1, including a drive mechanism that engages a portion of the first drive members, the drive mechanism imparting a motive force to simultaneously propel some of the pallets along one of the straight sections in a first direction and some others of the pallets along the other straight section in a second, opposite direction.

4. The system of claim 3, wherein the drive mechanism engages a portion of the second drive members.

5. The system of claim 3, wherein the first and second drive members include drive teeth and the drive mechanism includes at least two belts having driving members that engage the respective drive member teeth and a motor that moves the belts to impart the motive force to the drive members.

6. The system of claim 3, including a plurality of driving mechanisms, one of said mechanisms positioned near one of the turnarounds and another one of said mechanisms positioned near the other turnaround.

7. The system of claim 1, wherein the first drive members each include a plurality of panel portions that arc connected to permit relative movement between the panel portions.

8. The system of claim 7, wherein each first drive member is associated with one of the pallets and includes a first panel portion pivotally supported adjacent the first lateral edge on the pallet and a second panel portion supported adjacent the first lateral edge on the same pallet such that the first and second panel portions may pivot relative to each other and the pallet along an axis that is parallel to the step surface of the pallet.

9. The system of claim 7, wherein a first panel portion associated with one of the pallets is pivotally connected to a second panel portion associated with an adjacent pallet such that the first and second panel portions may pivot relative to each other about an axis that is generally perpendicular to the step surface.

10. The system of claim 9, including a guide rail extending along the path and a first follower mechanism that follows the guide rail as the pallets travel along the path, the first follower mechanism being supported adjacent the connection between the first and second panel portions and including a first roller on one side of the rail and a second roller on an opposite of the rail.

11. The system of claim 1, wherein the second drive members each comprise a panel having a first end supported adjacent the second lateral edge of a corresponding one of the pallets and a second end positioned beyond the corresponding pallet, each panel being movable relative to the corresponding pallet.

12. The system of claim 11, wherein the releasable connection comprises a hook portion near either the first or second end of each panel and a support member near the other of the first or second end of each panel, the hook portion of one second drive panel engaging the support of an adjacent second drive panel to selectively connect the panels together.

13. The system of claim 12, wherein the hook portion comprises a recess formed near one of the ends of the panel and the support member comprises a post near the other end.

14. The system of claim 13, wherein the recess includes a tapered section that is operative to guide the hook onto the post of an adjacent panel as the panels are connected together.

15. The system of claim 11, including a guide track that extends along the path and a second follower mechanism associated with each second drive panel, the guide track causing relative movement between adjacent second drive panels such that the releasable connection is selectively engaged or disengaged as the pallets travel between the straight and turnaround sections of the path.

16. The system of claim 15, wherein the second follower mechanism includes at least one roller supported on the corresponding panel and wherein the guide track causes the roller and the panel to move relative to the corresponding pallet and the adjacent panel as the releasable connection is engaged or disengaged.

17. The system of claim 15, wherein the guide track restricts movement of the second follower mechanism as the pallets travel along the straight sections such that the second drive panels remain connected together and stationary relative to the corresponding pallets along the straight sections.

18. A passenger conveyor system, comprising:

a plurality of pallets each having a step surface that is adapted to support at least one foot of at least one person;

a guide structure that guides the pallets along a selected path including two passenger supporting straight sections moving in different directions and turnaround sections connecting the ends of the straight sections;

a plurality of first drive members associated with one side of the pallet step surfaces such that the first drive members move with the pallets along the path;

a plurality of second drive members associated with an opposite side of the pallet step surfaces such that the second drive members move with the pallets along the path; and a drive mechanism that engages at least the plurality of first drive members to provide a motive force to propel the pallets in both directions along the path, including a guide track that guides the pallets, the track having a first straight section along which the pallets travel in a first direction and a second straight section parallel to the first straight section along which the pallets travel in a second, opposite direction, the track having a turnaround section at each end of the straight sections which completes the path along which the pallets travel, the first drive members remaining connected together along the entire path, the second drive members being connected together along the straight sections and disconnected along the turnaround sections.

19. A passenger conveyor system, comprising, a plurality of pallets each having a step surface that is adapted to support at least one foot of at least one person;

a guide structure that guides the pallets along a selected path including two passenger supporting straight sections moving in different directions and turnaround sections connecting the ends of the straight sections;

a plurality of first drive members associated with one side of the pallet step surfaces such that the first drive members move with the pallets along the path;

a plurality of second drive members associated with an opposite side of the pallet step surfaces such that the second drive members move with the pallets along the path; and a drive mechanism that engages at least the plurality of first drive members to provide a motive force to propel the pallets in both directions along the path wherein the plurality of first drive members move relative to the pallets along the turnaround sections and remain stationary relative to the pallets along the straight sections and wherein the plurality of second drive members are disconnected from each other along the turnaround sections.

* * * * *

UNITED STATES PATENT AND TRADEMARK OFFICE

CERTIFICATE OF CORRECTION

PATENT NO. : 6,640,957 B2
DATED : November 4, 2003
INVENTOR(S) : Fargo et al.

It is certified that error appears in the above-identified patent and that said Letters Patent is hereby corrected as shown below:

Column 9,
Line 52, "arc" should be -- are --

Signed and Sealed this

Thirtieth Day of December, 2003

JAMES E. ROGAN
*Director of the United States Patent and Trademark Office*